United States Patent [19]

Umeda et al.

[11] Patent Number: 4,737,666
[45] Date of Patent: Apr. 12, 1988

[54] INTEGRATED CIRCUIT SEMICONDUCTOR DEVICE WITH REDUCED POWER DISSIPATION IN A POWER-DOWN MODE

[75] Inventors: Yasushi Umeda; Toshio Ichiyama, both of Itami, Japan

[73] Assignee: Mitsubishi Denki Kabushiki Kaisha, Tokyo, Japan

[21] Appl. No.: 861,849

[22] Filed: May 12, 1986

[30] Foreign Application Priority Data

May 15, 1985 [JP] Japan ................... 60-105629

[51] Int. Cl.$^4$ .......................................... H03K 19/096
[52] U.S. Cl. ........................................ 307/480; 307/449; 307/452; 307/481
[58] Field of Search ............... 307/443, 448, 449, 451, 307/452, 463, 480–481, 264; 365/227–228; 364/707

[56] References Cited

U.S. PATENT DOCUMENTS

| | | | |
|---|---|---|---|
| 4,042,841 | 8/1977 | Hills et al. ..................... | 307/448 X |
| 4,381,552 | 4/1983 | Nocilini et al. ................ | 365/227 X |
| 4,387,449 | 6/1983 | Masuda ......................... | 365/227 |
| 4,512,029 | 4/1985 | Brice ............................. | 377/33 |
| 4,581,549 | 4/1986 | Aoyama et al. ................ | 307/452 |
| 4,594,519 | 6/1986 | Ohtani et al. .................. | 307/443 |
| 4,627,085 | 12/1986 | Yuen ............................. | 307/480 X |

FOREIGN PATENT DOCUMENTS

| | | |
|---|---|---|
| 0103755 | 3/1984 | European Pat. Off. . |
| 0140814 | 8/1985 | European Pat. Off. . |
| 2127999 | 9/1983 | United Kingdom . |
| 2130765 | 10/1983 | United Kingdom . |

OTHER PUBLICATIONS

8-Bit Parallel Microprocessor M5M80C88P, produced by Mitsubishi Elec. Co. Ltd.

Primary Examiner—Stanley D. Miller
Assistant Examiner—D. R. Hudspeth
Attorney, Agent, or Firm—Birch, Stewart, Kolasch & Birch

[57] ABSTRACT

A semiconductor integrated circuit device includes a switch for switching an external clock; a signal generator for generating a power down signal for controlling said switch; said signal generator being responsive to an external signal input designating the status of the output of the microprocessor provided at the periphery of the device and an internal control signal of the device for producing said power down signal in a special combination logic state of said external signal input and said internal control signal; the device being set in a power dissipation reduction mode when said power down signal is generated.

5 Claims, 3 Drawing Sheets

F I G .1.
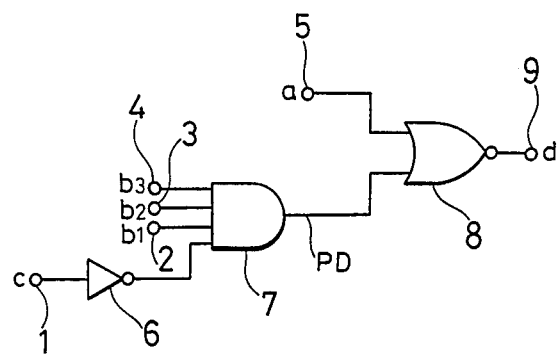
F I G .2.
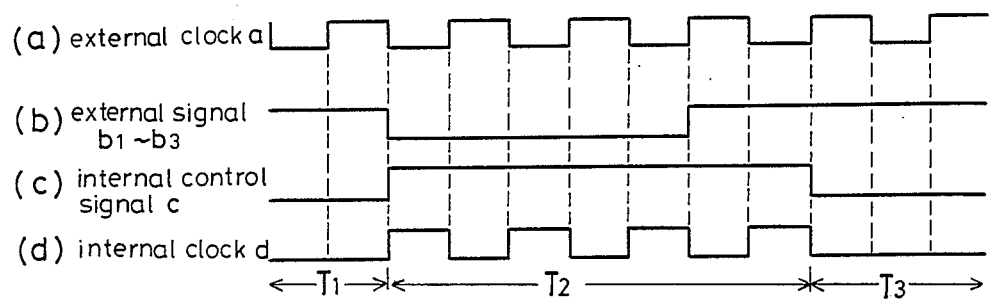
(a) external clock a
(b) external signal b1~b3
(c) internal control signal c
(d) internal clock d F I G .5.
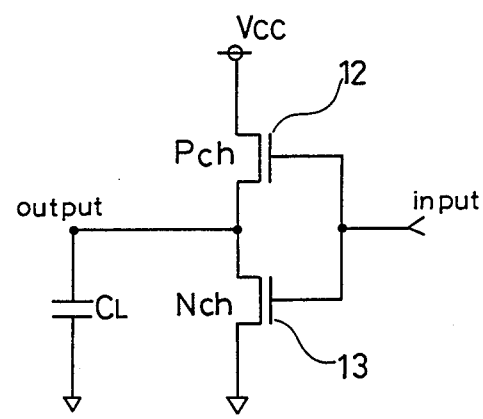

INTEGRATED CIRCUIT SEMICONDUCTOR DEVICE WITH REDUCED POWER DISSIPATION IN A POWER-DOWN MODE

FIELD OF THE INVENTION

The present invention relates to a semiconductor integrated circuit device, and more particularly to the reduction of the power dissipation in a CMOS IC circuit.

BACKGROUND OF THE INVENTION

Conventionally, a base-controller constituted as a semiconductor integrated circuit device is designed to decode an external signal input designating the status of a microprocessor output and to output a control signal at appropriate timings. This conventional base-controller has a circuit construction using bipolar transistors, and there currently is no base-controller circuit with lowered power dissipation.

A prior art semiconductor integrated circuit device aiming to lower the power dissipation is an 8-bit parallel microprocessor M5M80C88P produced by Mitsubishi Electric Co., Ltd. This device has a sleep mode where some internal clocks are halted by executing the HALT instruction. Additionally, in this device external signals are decoded to halt the internal clocks in a special state, whereby the power dissipation is reduced.

SUMMARY OF THE INVENTION

An object of the present invention is to provide a semiconductor integrated circuit device in which the power dissipation is reduced.

Another object of the present invention is to provide a semiconductor integrated circuit device having a circuit construction using CMOS transistors in which the power dissipation is further reduced.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a semiconductor integrated circuit device comprising: switching means for switching an external clock; a signal generator for generating a power down signal for controlling said switching means; said signal generator being responsive to an external signal input designating the status of the output of the microprocessor which is provided at the periphery of the device and an internal control signal of the device for producing said power down signal in a special combination state of said external signal input and said internal control signal; and the device being set at a power dissipation reduction mode when said power down signal is generated.

BRIEF DESCRIPTION OF THE DRAWINGS

FIG. 1 is a circuit diagram showing a semiconductor integrated circuit device as an embodiment of the present invention;

FIGS. 2(a)–2(d) are timing charts for explaining the operation of the embodiment.

FIG. 5 is a circuit diagram of the inverter of FIG. 4(a) for explaining the AC current which flows through this circuit.

DETAILED DESCRIPTION OF THE PREFERRED EMBODIMENTS

Figure 3:
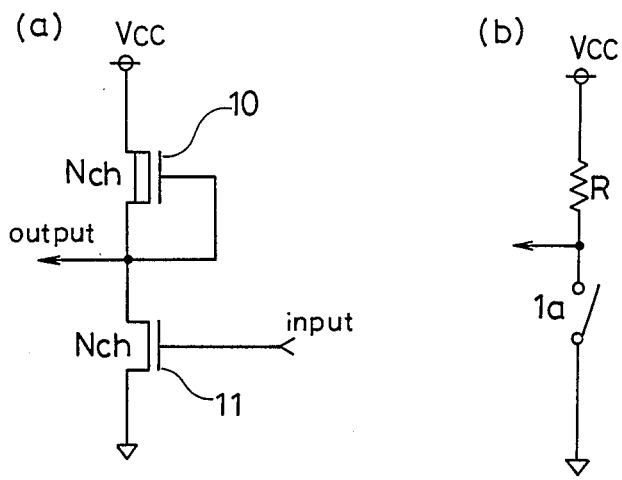
FIG. 3(a) is a circuit diagram showing an inverter constituted by NMOS transistors.
Figure 3(b) is an equivalent circuit of FIG. 3(a) obtained by replacing the circuit elements.

In order to explain the present invention in detail, reference will be particularly made to FIGS. 1 and 2.

FIG. 1 shows a circuit construction of a semiconductor integrated circuit device as an embodiment of the present invention. In this embodiment an external clock input as a system clock is controlled in accordance with the external signal input designating the status of the microprocessor output.

In FIG. 1 there are provided an input terminal 1 for an internal control signal c, and input terminals 2, 3, and 4 for receiving each bit $b_1$ to $b_3$ of an external signal which is output from the microprocessor. The microprocessor outputs an external signal $b_1$ to $b_3$ in accordance with its state, and when it stopped it outputs an external signal of "111". There are also provided an iput terminal for an external clock a, and an inverter 6 which receives an internal control signal c through the input terminal 1. This internal control signal c is a signal produced for generating a power down signal PD when the external signal is "111". A power down signal generator comprising an AND gate 7 is provided to receive the external signal $b_1$ to $b_3$ through the input terminals 2 to 4, and the output of the inverter 6. This AND gate 7 generates a power down signal PD in response to a special condition of the external signal $b_1$ to $b_3$ and the output of the inverter 6. A NOR gate 8 is provided to receive the power down signal PD from the power down signal generator 7 and the external clock a through the input terminal 5, and this NOR gate 8 outputs an internal clock d at its output terminal 9. The inverter 6, the power down signal generator 7, and the NOR gate 8 are constituted by CMOS integrated circuits using CMOS transistors. These circuits 6, 7, and 8 constitute a circuit for reducing power dissipation.

Before describing the operation of the device, the reason why the power dissipation is reduced in a circuit construction using CMOS transistors will be described with reference to FIGS. 3 and 4.

Figure 4:
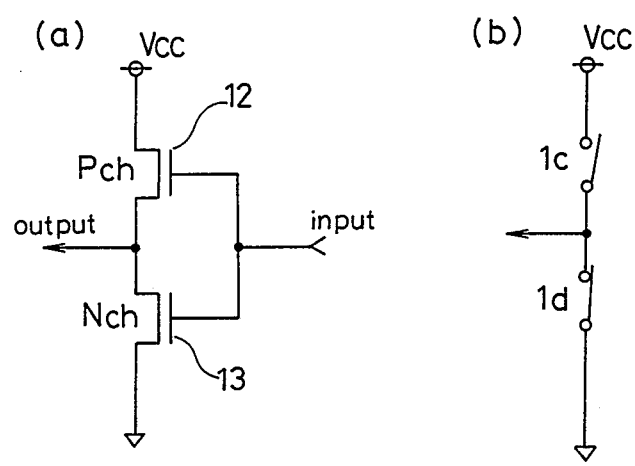
FIG. 4(a) is a circuit diagram showing an inverter constituted by CMOS transistors.
Figure 4(b) is a circuit model of FIG. 4(a) obtained by replacing the circuit elements.

FIG. 3 shows an inverter constituted by NMOS transistors, and FIG. 4 shows an inverter constituted by CMOS transistors. Generally, MOS transistors have extremely high input impedance, and a current for driving the next stage can be ignored except for transient states in both of NMOS and CMOS transistors.

The NMOS inverter shown in FIG. 3 is constituted by a load transistor 10 and a drive transistor 11, and an equivalent circuit shown in FIG. 3(b) is obtained by replacing the load transistor 10 by a resistor R and the driver transistor 11 by a switch 1a. When a signal "L" is input in this circuit, the switch 1a is opened so that the circuit will output a signal "H". When a signal "H" is input, the switch 1a is closed so that the circuit will output a signal "L". In this circuit operation, a DC current flows constantly from the power supply Vcc to the ground.

On the other hand, a CMOS inverter is constituted by a P channel transistor 12 and an N channel transistor 13 as shown in FIG. 4(a), and an equivalent circuit shown in FIG. 4(b) is obtained by replacing the P and N channel transistors 12 and 13 by switches 1c and 1d, respectively. When a signal "L" is input in this circuit, the switches 1c and 1d are closed and opened, respectively, so that the circuit will output a signal "H". When a signal "H" is input, the switches 1c and 1d are opened and closed, respectively, so that the circuit will output a signal "L". In this way, the switches 1c and 1d are complementarily opened or closed, thereby permitting no DC current flow through the circuit. Accordingly, the dissipation current is reduced in CMOS circuits.

The operation of the device of FIG. 1 will be described below.

When all bits $b_1$ to $b_3$ of the external signal designating the status of the microprocessor output are "H", indicating that the microprocessor is stopped, and the internal control signal c shown in FIG. 2(c) is "L" (time period $T_1$ in FIG. 2), the control signal c of "L" is inverted by the inverter 6, and it is input to the power down signal generator 7. Then, the power down signal PD that is output from the generator 7 becomes "H", and this output "H" is input to the NOR gate 8. Thus, the NOR gate 8 outputs "L" regardless of the external clock a having a periodic waveform as shown in FIG. 2(a). In this way, the internal clock d at the output terminal 9 is fixed to "L" as shown in FIG. 2(d), and the device is set at the power dissipation reduction mode.

When the internal control signal c shown in Figure 2(c) becomes "H" (time period $T_2$ in FIG. 2), the power down signal PD that is output from the generator 7 falls down to "L" immediately regardless of the state of the external signal $b_1$ to $b_3$, and the inverted signal of the external clock a apears at the output of the NOR gate 8 as shown in FIG. 2(d). In this way, the power dissipation reduction mode is cancelled, and the device returns to the normal operation mode.

When all the bits $b_1$ to $b_3$ of the external signal become "H" and the internal control signal c becomes "L" (time period $T_3$ in FIG. 2), the device enters the power dissipation mode in the same manner as described above.

It is to be noted that, in a condition where the bits $b_1$ to $b_3$ of the external signal are not all "H", the power down signal PD does not become "H" even if the internal control signal c is "L". Such a case is not illustrated in FIG. 2.

As described above, the internal clock is temporarily fixed to a specific value in this embodiment. When the internal clock is halted in the CMOS circuit the power dissipation is reduced as described below.

Only a quite small DC current flows in a CMOS circuit as described above, and the dissipation current is dominated by an AC current having a low order. This AC current is a transient switching current, and it includes as main components a current for charging or discharging the load capacitance CL and a current which instantaneously flows through the circuit, for example, that which flows from the power supply Vcc to ground while the P channel and the N channel transistors are ON simultaneously during the transition of the input from "H" to "L" (refer to FIG. 5). Such an AC current is approximately proportional to the switching frequency because it only flows at the switching. Accordingly, it is possible to lower the AC current to approximately zero and thereby to reduce the dissipation current by halting the clock which is switched ON and OFF repeatedly at a high speed. Only a leak current having a factor in the much lower order becomes a dissipation current.

In this way, the device is set at in the power dissipation reduction mode by the output of the power down signal generator 7 when the inputs of the external signal $b_1$ to $b_3$ and the internal control signal c comply with a special condition, in which, in the preferred embodiment, all inputs to gate 7 are "H" and the internal clock d that is to be output from the NOR gate 8 is temporarily fixed to a specific value, whereby the dissipation current by the charge and discharge of the load capacitance is reduced. Thus, the reduction of power dissipation can be achieved by only providing a few additional logic gates.

In the above-illustrated embodiment, the power dissipation reduction circuit is composed of the inverter 6, the AND gate 7, and the NOR gate 8, but it may be constituted by other logic circuits with the same effects.

As is evident from the foregoing, according to the present invention, a semiconductor integrated circuit device is constituted by CMOS integrated circuit logic using CMOS transistors, and the internal system clock is temporarily fixed to a specific value, whereby the power dissipation is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An integrated circuit semiconductor device comprising:
    switch means, connected to a node coupled to receive an external clock signal from a source external to said device, for producing an internal clock signal; and
    signal generator means, responsive to an external signal indicating the operational mode of a microprocessor, and responsive to an internal control signal that is independent of the operational mode of said microprocessor, for controlling the operation of the switch means, said signal generator means being responsive to a predetermined combination logic state of said external signal and said internal control signal to produce a power-down signal for inhibiting the operation of said switch means,
    said switch means setting said device in a power dissipation reduction mode when said switch means is inhibited.

2. An integrated circuit semiconductor device as defined in claim 1, wherein said switch means comprises a NOR gate having input terminals connected to nodes coupled to receive said external clock signal and said power-down signal, and said signal generator means comprises an AND gate having input terminals connected to nodes coupled to receive said external signal and said internal control signal, and an output terminal for outputting said power-down signal.

3. An integrated circuit semiconductor device as defined in claim 2, wherein said external signal comprises a 3-bit signal indicative of the operational mode of said microprocessor.

4. An integrated circuit semiconductor device as defined in claim 2, wherein said NOR and AND gates comprise CMOS transistors.

5. An integrated circuit semiconductor device as defined in claim 2, further comprising an inverter connecting said internal control signal to an input terminal of said AND gate.

* * * * *